United States Patent [19]

Mrotzeck et al.

[11] Patent Number: 4,963,660

[45] Date of Patent: Oct. 16, 1990

[54] PROCESS FOR THE REDUCTION OF HEAVY METAL IONS IN EXCESS FROM AQUEOUS SYNTHESIS SOLUTIONS OF WATER SOLUBLE HEAVY METAL COMPLEX DYESTUFFS

[75] Inventors: Uwe Mrotzeck, Kelkheim; Peter Mischke, Bad Soden am Taunus; Günther Schwaiger, Frankfurt am Main; Werner Russ, Hofheim am Taunus; Manfred Sittig, Kriftel, all of Fed. Rep. of Germany

[73] Assignee: Hoechst Aktiengesellschaft, Frankfurst am Main, Fed. Rep. of Germany

[21] Appl. No.: 238,359

[22] Filed: Aug. 30, 1988

[30] Foreign Application Priority Data

Sep. 2, 1987 [DE] Fed. Rep. of Germany ....... 3729322
Jul. 29, 1988 [DE] Fed. Rep. of Germany ....... 3825815

[51] Int. Cl.$^5$ ............... C09B 45/00; C09B 67/00; C09B 62/503; C09B 62/04
[52] U.S. Cl. .................... 534/618; 534/617; 534/622; 534/623; 534/624; 534/625; 534/626; 534/627; 534/628; 534/629; 534/887; 540/126; 540/133
[58] Field of Search ................ 534/602, 692–725, 534/617–629; 540/126, 133

[56] References Cited

U.S. PATENT DOCUMENTS 4,180,502 12/1979 Kaufmann ............... 534/602
4,400,317 8/1983 Corso .................... 534/602
4,607,098 8/1986 Schwaiger ............... 534/602 X

FOREIGN PATENT DOCUMENTS 1310414 5/1987 U.S.S.R. ............... 534/602

Primary Examiner—Floyd D. Higel

[57] ABSTRACT

Free radical heavy metal ions in water-soluble heavy metal complex dyestuffs are removed from the synthesis solution of the heavy metal complex dyestuff by means of a compound or several of the compounds mentioned below:

(a) saturated and unsaturated fatty acids having about 8 to 18 carbon atoms and water-soluble salts thereof;
(b) the monoesters and diesters of orthophosphoric acid and salts thereof corresponding to the general formula (1a) and (1b)

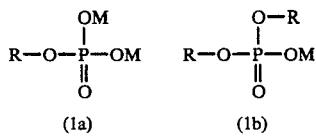

in which R denotes a saturated or unsaturated aliphatic radical having about 8 to 18 carbon atoms and M stands for a hydrogen atom or a salt-forming, water-solubilizing metal;

(c) aliphatic sulfonic acids and water-soluble salts thereof corresponding to the general formula (2)

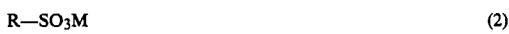

in which R and M have the abovementioned meanings;

(d) aliphatic phosphonic acids and monoesters thereof and also water-soluble salts thereof corresponding to the general formulae (3a) and (3b)

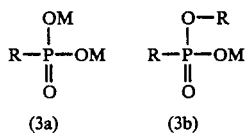

in which R and M have the abovementioned meanings;

(e) malonic acid and water-soluble salts thereof;
(f) trimercapto-s-triazine, 2-aminobenzoic acid, 8-hydroxyquinoline and water-soluble salts of these compounds;
(g) water-soluble sulfides, in particular alkali metal sulfides;
(h) functionalized water-insoluble polymers which react with metal ions by the ion-exchanger principle or form metal chelate complexes.

Using these compounds, the excess heavy metal ions are precipitated out of the synthesis solution or separated off, without the heavy metal ions bound as a complex in the dye being attached.

7 Claims, No Drawings

PROCESS FOR THE REDUCTION OF HEAVY METAL IONS IN EXCESS FROM AQUEOUS SYNTHESIS SOLUTIONS OF WATER SOLUBLE HEAVY METAL COMPLEX DYESTUFFS

DESCRIPTION

The invention is in the technical field of water-soluble heavy metal complex dyestuffs.

In the preparation of heavy metal complex dyestuffs, in order to obtain quantitative conversion in the metalation step or even to accelerate the reaction such as, for example, in demethylating coppering, an excess amount of the heavy metal salt is used; the excess shows up in the finished heavy metal complex dyestuff, for which reason its use as a dye is connected with coloristic and ecological problems. This is the case especially if the aqueous dyestuff solutions obtained after the synthesis are—as is customary nowadays—spray-dried (evaporated). In this case, the ionogenic heavy metal content is usually above 1,000 ppm.

However, heavy metal ions, due to their toxicity, pollute the environment to a particular extent, because they cannot be destroyed but merely modified chemically such as, for example, by conversion into soluble or insoluble heavy metal compounds or by reduction to the element. Furthermore, in practical application, difficulties often arise when heavy-metal-containing dyestuffs are used in combination dyeings with dyestuffs which themselves carry, for example, hydroxy carboxy, amino or thio groups as substituents, which complex with the excess metal ions under the customary dyeing conditions as a result of which the dyeing properties of these dyestuffs can be modifed in an unfavorable manner.

Attempts to keep the ionogenic heavy metal content in heavy metal complex dyestuffs to a minimum solely by largely reducing the metal salt excess have been found to be unfeasible in practical operation because the endpoint determination of a metalation is time consuming and thus uneconomical.

Therefore, to reduce the ionogenic heavy metal content in the final dyestuff, those process steps are preferred by which the heavy metal ions can be precipitated out gravimetrically after the synthesis of the heavy metal complex dyestuff and be separated off from the dyestuff solution by filtration. Thus, in the synthesis of copper complex dyestuffs oxalic acid is used for this purpose. However, the efficiency of this method, even after optimization, is often unsatisfactory and, if the amount of oxalic acid is increased, the copper already bound as a complex in the final dyestuff can be attacked and be dissolved out of the copper complex final dyestuff.

Conventional process steps for reducing the heavy metal content in waste waters, such as, for example, the conversion of the heavy metal ions to their very slightly soluble metal sulfides by passing in hydrogen sulfide, have not yet been integrated into the preparation processes of heavy metal complex dyestuffs either because of the assumption that the ionogenic heavy metal and the heavy metal bound as a complex would be attacked unselectively due to the high reactivity of the sulfide, as a result of which the metal complex dyestuff would be destroyed. Furthermore, it is known that many dyestuffs such as, for example, azo dyestuffs, can be reduced by sulfide.

In addition, aromatic complexing agents which are used for the gravimetric determination of heavy metals are known from the literature. However, many of these complexing agents cannot be used in practical operation for reducing the heavy metal content in the preparation of water-soluble heavy metal complex dyestuffs, since they themselves are not sufficiently water-soluble, thus requiring an organic co-solvent. Using organic and inorganic complexing agents such as cyanide, condensed phosphates, ammonia, thiosulfates, polyalkanolamines such as, for example, triethanolamine, polyamines such as, for example, ethylenediamine, polyaminopolycarboxylic acids such as, for example, ethylenediaminetetraacetic acid, or polycarboxylic acids such as, for example, tartaric acid and gluconic acid, it is only possible to convert heavy metal ions into watersoluble complexes and "mask" them in this manner. Ecological problems remain still unsolved by this process step.

These known process steps are therefore unsatisfactory for achieving the desired goal of reducing the heavy metal content. Therefore, the object still remained to find a process for the selective removal of ionogenic heavy metals from the synthesis solutions.

It has now been found that by using the present invention the ionogenic heavy metal content in the synthesis of water-soluble heavy metal complex dyestuffs can surprisingly be drastically reduced without significant attack of the heavy metal ions of the dyestuff which are bound as a complex/or without the equivalent of grade-diminishing side reactions if the removal of the excess heavy metal ions from the synthesis solution is carried out by means of a compound or several of these compounds such as, for example, 2, 3 or 4 of these compounds, from the following group of compounds:

(a) saturated and unsaturated fatty acids having about 8 to 18 carbon atoms, preferably 12 to 18 carbon atoms, preferably saturated fatty acids, and water-soluble salts thereof such as, in particular, alkali metal salts such as sodium salts and potassium salts;

(b) the monoesters and diesters of orthophosphoric acid and water-soluble salts thereof corresponding to the general formulae (1a) and (1b)

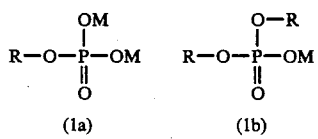

in which R denotes a saturated or unsaturated aliphatic radical, preferably an alkyl radical, having about 8 to 18 carbon atoms, preferably 12 to 18 carbon atoms, it being possible for both Rs in formula (1b) to be identical to or different from one another, and M stands for a hydrogen atom or a salt-forming, water-solubilizing metal such as, for example, an alkali metal such as sodium and potassium;

(c) aliphatic sulfonic acids and water-soluble salts thereof corresponding to the general formula (2)

$$R\text{---}SO_3M \qquad (2)$$

in which R and M have the abovementioned meanings;

(d) aliphatic phosphonic acids and monoesters thereof and also water-soluble salts thereof corresponding to the general formulae (3a) and (3b)

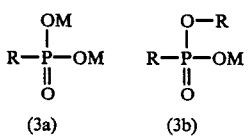

(3a)  (3b)

in which R and M have the abovementioned meanings, it being possible for the Rs to have meanings identical to or different from one another;

(e) malonic acid and water-soluble salts thereof such as, in particular, alkali metal salts such as sodium and potassium salts:

(f) trimercapto-s-triazine, 2-aminobenzoic acid, 8-hydroxyquinoline and the water-soluble salts of these compounds, in particular alkali metal salts thereof, preferably sodium salts;

(g) water-soluble sulfides, in particular alkali metal sulfides, preferably sodium sulfide;

(h) functionalized polymers which react with metal ions by the ion-exchanger principle or form metal chelate complexes, in particular ion-exchangers having $SO_3X$ and COOX substituents as exchanging groups (X standing for a hydrogen atom or an alkali metal such as sodium), and of these preferably weakly acid ion-exchangers having COOX substituents as exchanging groups.

The removal of the free heavy metal ions from the aqueous dyestuff solutions such as, for example, of iron, nickel, cobalt, chromium and copper ions, in particular nickel and copper ions, is carried out by means of the compounds mentioned in sections (a) to (g) and used according to the invention by conversion to their water-insoluble compounds, which precipitate from the aqueous dyestuff solutions and can easily be separated off therefrom, for example by filtration or centrifuging, with or without the addition of a conventional clarifier such as activated carbon or kieselguhr. The dyestuff solution is then largely free from heavy metal salts and can be worked up further in accordance with the preparation method for the dyestuff in question. As a rule, the ionogenic metal content of the dyestuff solution can be reduced to under 20 ppm by using the measure according to the invention.

In general, the precipitation is carried out in a pH range from 2 to 10, preferably from 4 to 7, the preferred pH range being also favorable for and not detrimental to the heavy metal complex dyestuffs having fiber-reactive groups. The efficiency of the compounds used according to the invention for the precipitation of heavy metal ions from the dyestuff solutions is independent or only slightly dependent upon whether these compounds are used in the form of their acids or in the form of their salts because their ratio is controlled by the pH of the solution. As a rule, the efficiency of the precipitation increases with increasing pH. Advantageously, the desired or required pH range of the precipitation is controlled by means of conventional buffer substances such as, for example, formates, acetates, hydrogenphosphates, bicarbonates, carbonates, propionates and tartrates of alkali metals as the corresponding bases of the buffer system. For the weakly acid pH range, in particular the conventional acetic acid/alkali metal acetate buffer is of advantage.

The removal (precipitation) according to the invention of the heavy metal ions such as, in particular of the $Cu^{2(+)}$ ions, from the synthesis solutions of the heavy metal complex dyestuffs, preferably the copper complex dyestuffs, is carried out using the compounds of sections (a) to (g), as a rule, at a temperature between 10° and 100° C. and, as far as compounds mentioned in sections (a) to (f) are concerned, preferably at a temperature between 50° and 90° C.

Compounds (a) to (g) can be added to the dyestuff solutions in solid (powdered) form or in the form of an aqueous suspension or an aqueous solution which, in the case of poorly soluble precipitants, preferably has a temperature of 50° to 90° C.

The precipitating agent added is used in an amount which is adjusted to the excess of heavy metal ions. However, to precipitate the excess heavy metal ions completely, it is advisable to use an excess of precipitating reagent in addition to the amount which is required by theory and dependent on the ionogenic heavy metal content of the dyestuff solution. For this purpose, the ionogenic heavy metal content of the metalated dyestuff solution is first determined by means of conventional analytical methods such as, for example, photometry, potentiometry or atomic absorption spectroscopy. If merely the amount of precipitants listed in sections (a) to (g) required by theory is used, such as, for example, 1 mol of sulfide or 2 mol of 2-aminobenzoic acid or ⅔ mol of trimercapto-s-triazine per mol of heavy metal ions, the ionogenic heavy metal content of the dyestuff solution is certainly reduced significantly, but it is usually above 20 ppm.

To achieve an even more effective reduction of the ionogenic heavy metal content, an excess amount of precipitant can be used, the excess referring to the dyestuff content of the dyestuff solution. The excess amount used is dependent on the precipitant used, on the complex stability of the dyestuff and on the tendency of the dyestuff to enter into undesirable side reactions with the precipitant. However, the effective amount of excess precipitant can be easily determined by preliminary tests. However, too much of an excess should be avoided to avoid undesirable side reactions.

Relative to the amount of dyestuff of 1 mol, the excess to be used in the case of sodium sulfide or trimercapto-striazine as the precipitating agent is, for example, usually between 0.01 and 0.1 mol, in the case of 2-aminobenzoic acid, 8-hydroxyquinoline or the alkali metal salts of fatty acids such as, in particular, sodium stearate, between 0.01 and 0.25 mol and in the case of the precipitating agents listed in sections b) to e) between 0.01 and 0.3 mol.

After the precipitation of the heavy metal ions, it is advantageous to cool the reaction solution to room temperature before separating off the precipitated heavy metal compounds, in order to achieve complete precipitation and separation, because the solubility of the heavy metal compounds formed is lower at room temperature than when heated.

Saturated and unsaturated fatty acids (or salts thereof), which are used according to the invention, are in particular stearic acid, palmitic acid, myristic acid, lauric acid, capric acid, octanoic acid, isodecanoic acid, isononanoic acid, 2-ethylhexanoic acid and oleic acid, preferably in the form of their sodium salts. Particular preference is given to stearic acid and sodium stearate.

Of the compounds listed in (b), (c) and (d), in particular those are suitable in which R denotes the stearyl, palmityl, myristyl, lauryl, decyl, octyl, isodecyl, isononyl, 2-ethylhexyl or oleyl groups. Of the compounds under (b), in particular mixtures, preferably of about equal parts such as, for example, in a ratio by weight of 60:40 to 40:60 parts, of the monolauryl and dilauryl esters of orthophosphoric acid or alkali metal salts thereof such as sodium salts should be mentioned; the hydrolysis of phosphoric acid esters or of alkanephosphonic acid monoesters, which usually occurs in an aqueous medium, can be disregarded over the pH range from 4 to 8, in which the precipitation reaction of the heavy metal from the aqueous dyestuff synthesis solution usually takes place.

Polymers according to section (h) are in particular systems in which ion-exchanging groups are incorporated in the condensation or polymerization resins, thus forming a water-containing yet water-insoluble gel structure, through whose pores, into which the groups capable of ion-exchange project, the diffusion of the synthesis solution of the heavy metal complex dyestuffs takes place. Ion-exchanging functional groups are, for example, carboxyl and sulfo groups in the form of their acids or salts such as, preferably, in the form of the lithium salt, sodium salt and potassium salt. The use of ion-exchangers for reducing the ionogenic heavy metal content has the advantage that the ion-exchanger after use can be regenerated and be used again by conditioning with suitable, conventional aqueous acids or alkali metal salt solutions. Furthermore, using them has the advantage that the removal of the heavy metal ions from the dyestuff solution takes place under very mild conditions because it does not require elevated temperatures. In general, the exchange is carried out at room temperature (10°–30° C.). To remove the heavy metal ions from concentrated dyestuff solutions, it is advantageous to select the ratio of exchange capacity to the amount of heavy metal ions to be exchanged to be as large as possible.

The specific removal according to the invention of heavy metal ions by means of the precipitants or polymers listed in sections (a) to (h) can be integrated into the preparation processes of all water-soluble heavy metal complex dyestuffs, provided the heavy metal complex bond in the dyestuff is sufficiently stable. Heavy metal complex dyestuffs which are particularly suitable in this respect are the heavy metal complex dyestuffs, in particular the 1:1 copper, 1:2 cobalt, 1:2 chromium and also the nickel and iron complex compounds of monoazo, disazo and trisazo dyestuffs, of these preferably the 1:2 copper complex monoazo and disazo dyestuffs, furthermore the heavy metal complex dyestuffs of the azomethine and formazan type, in particular of carboaromatic or heteroaromatic 1,5-diarylformazans having the structural element of the general formula (4)

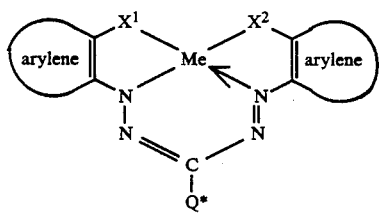
(4)

in which "arylene" denotes a substituted or unsubstituted arylene radical, Q* stands for a hydrogen atom, a substituted or unsubstituted aryl or alkyl radical or an acyl radical or is a halogen atom, a cyano or nitro group or an optionally substituted heterocyclic radical. Me is a heavy metal atom, preferably a copper atom in this case, and $X^1$ and $X^2$ are identical to or different from one another, each denoting an oxy, amino, alkylamino, arylamino, sulfo or carbonyloxy group binding the heavy metal in the form of a complex, furthermore tetracyclic heavy metal complex dyestuffs having the structural element corresponding to the general formula (5)

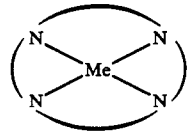
(5)

in which Me stands for the heavy metal central atom, preferably the copper, nickel, cobalt or iron central atom in this case, such as, in particular, the phthalocyanine heavy metal complex dyestuffs of these heavy metals, and in particular the copper complex and nickel complex phthalocyanine dyestuffs.

These dyestuffs are, for example, in particular dyestuffs corresponding to the general formulae (6a), (6b), 6c), (6d) and (6e)

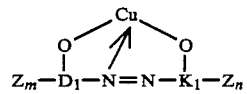
(6a)

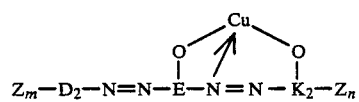
(6b)

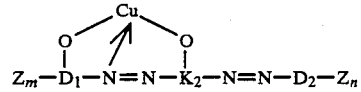
(6c)

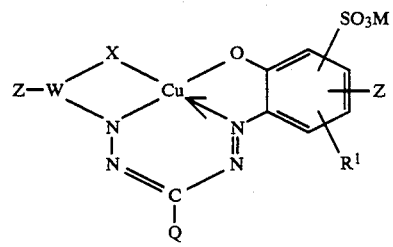
(6d)

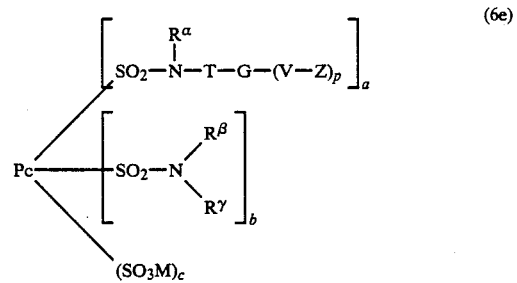
(6e)

in which the symbols have the following meanings:

$D_1$ is a benzene ring which can be substituted by 1, 2 or 3 substituents belonging to the group consisting of lower alkyl, lower alkoxy, carboxy, lower alkanoylamino, benzoylamino, phenylamino, sulfobenzoylamino, sulfophenylamino, carbamoyl, carbamoyl monosubstituted or disubstituted by lower alkyl and/or phenyl, sulfamoyl, monosubstituted or disubstituted by lower alkyl and/or phenyl, cyano, nitro, chloro, bromo, trifluoromethyl and sulfo, or $D_1$ is a naphthalene ring which can be substituted by 1, 2 or 3 sulfo groups and/or a carboxy, methyl, methoxy, ethoxy, nitro or acetylamino group or by a chlorine atom, the complexing oxygen atom in $D_1$ being bound in the ortho position relative to the azo group;

$D_2$ has one of the meanings mentioned for $D_1$ or is a benzothiazol-1-yl radical to whose benzene ring the group Z is bound and which can be substituted by a nitro, methyl, methoxy or sulfo group;

$K_1$ is a naphthalene ring which can be substituted by 1, 2 or 3 sulfo groups and/or an amino, methylamino, phenylamino, lower alkanoylamino, benzoylamino or N-methyl-N-acetylamino group, or $K_1$ is the radical of a pyrazol-4,5-ylene which is substituted in 3-position by methyl, carboxy, carbamoyl, lower carbalkoxy, such as carbomethoxy and carbethoxy, or phenyl and contains a phenyl or naphthyl radical bound in the 1-position, it being possible for the phenyl radical to be substituted by 1 or 2 sulfo groups and/or 1 or 2 substituents from the group consisting of lower alkyl, lower alkoxy, chloro, bromo, nitro, acetylamino and carboxy and for the naphthyl radical to be substituted by 1, 2 or 3 sulfo groups and/or one substituent from the group consisting of lower alkyl, lower alkoxy, nitro, acetylamino and carboxy, or $K_1$ as a radical of a coupling component is an acetoacetylanilide or acetoacetylnaphthylamide radical, it being possible for the phenyl radical to be substituted by 1 or 2 substituents belonging to the group consisting of lower alkyl, lower alkoxy, carboxy, acetylamino, benzoylamino, carbamoyl, carbamoyl monsubstituted or disubstituted by lower alkyl and/or phenyl, sulfamoyl, sulfamoyl monosubstituted or disubstituted by lower alkyl and/or phenyl, cyano, nitro, chloro, bromo, trifluoromethyl and sulfo, and for the naphthyl radical to be substituted by 1, 2 or 3 sulfo groups and/or a substituent from the group consisting of lower alkyl, lower alkoxy, nitro, acetylamino and carboxy, the complexing oxygen atom in $K_1$ being bound to the azo group in the ortho position;

$K_2$ as the radical of a bifunctional aminonaphthol coupling component stands for the naphthalene radical which can contain one or two sulfo groups;

Z is a hydrogen atom or preferably the β-hydroxyethylsulfonyl group or preferably a fiber-reactive group which is capable of forming a covalent bond with carboxamido-and/or hydroxy-containing material, in particular fiber material, such as, in particular, a fiber-reactive group from the chlorotriazinylamino, fluorotriazinylamino or vinylsulfonyl series, such as, for example, the vinylsulfonyl group or a group of the general formula (7a)

$$-CH_2-CH_2-Z^1 \quad (7a)$$

in which $Z^1$ is a substituent which can be eliminated by alkali, for ex., a chlorine atom, an acetyloxy, thiosulfato, phosphato or, in particular, a sulfato group, or such as, for example, a fiber-reactive group corresponding to the general formula (7b)

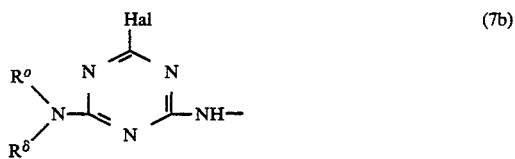

in which

Hal stands for a chlorine or fluorine atom, $R^o$ is a substituted or unsubstituted lower alkyl group such as, for example, an alkyl group substituted by hydroxy, cyano, carboxy, sulfo, phosphato, sulfato or phenyl and having from 1 to 4 carbon atoms, or is a phenyl or naphthyl radical which can be substitued by substituents from the group consisting of carboxy, sulfo, chloro, bromo, methyl, ethyl, methoxy, ethoxy, nitro, vinylsulfonyl and from a group of the abovementioned and defined general formula (7a) and $R^δ$ is a hydrogen atom or a substituted or unsubstituted lower alkyl group such as, for example, an alkyl group substituted by hydroxy, cyano, carboxy, sulfo, sulfato, phosphato or phenyl and having 1 to 4 carbon atoms;

m is the number 1 or 2, preferably 1, and n is the number 1 or 2, preferably 1, the sum (m+n) being no more than the number 3;

E as the middle component which first served as coupling component and then as diazo component in the synthesis of the dyestuff: represents a benzene ring which can be substituted by 1 or 2 substituents from the group consisting of lower alkyl, lower alkoxy, chloro, acetylamino, dimethylamino, diethylamino, ureido and phenylureido, or represents a naphthalene ring which can be substituted by lower alkyl, nitro, acetylamino or sulfo, or E is a radical of the general formula (8)

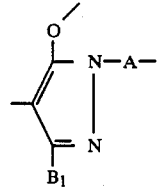

in which $B_1$ stands for the methyl or carboxy group and

A denotes a benzene or naphthalene ring, which can be substituted by 1 or 2 substituents from the group consisting of sulfo, carboxy, lower alkyl, lower alkoxy and chlorine;

M is a hydrogen atom or an alkali metal such as sodium, potassium or lithium;

W is a benzene or naphthalene ring, which can be substituted by substituents, preferably 1 or 2 substituents, from the group consisting of halogen such as fluoro, chloro and bromo, nitro, lower alkyl, such as isopropyl, tert.-butyl, tert.-amyl or isobutyl, in particular methyl and ethyl, alkoxy having 1 to 4 carbon atoms, such as methoxy and ethoxy, alkylsulfonyl having 1 to 4 carbon atoms, such as methylsulfonyl or ethylsulfonyl, phenylsulfonyl, sulfamoyl and N-monoalkylsulfamoyl and N,N-dialkylsulfamoyl each having 1 to 4 carbon atoms in the alkyl;

Q is a straight-chain or branched alkyl group having 1 to 8 carbon atoms such as a methyl, ethyl, isopropyl, n-butyl, sec.-butyl, tert.-butyl, n-heptyl or n-octyl group, or is a straight-chain or branched alkenyl group having 2 to 8 carbon atoms such as an allyl group, it being possible for these alkyl and alkenyl groups to be additionally substituted by a phenyl group which in turn can be substituted by substituents from the group consisting of methyl, ethyl, methoxy, ethoxy, fluoro, chloro, bromo and sulfamoyl, or is a phenyl or naphthyl group which can be substituted by substituents, preferably 1 or 2 substituents, from the group consisting of hydroxy, nitro, halogen such as fluoro, bromo or chloro, lower alkyl, lower alkoxy, carbalkoxy having 1 to 4 carbon atoms in the alkyl radical such as carbomethoxy or carbethoxy, and a group Z, or is a radical of furan, thiophene, pyrrol, imidazole, indole, pyrazole, pyridine, pyrimidine, quinoline or benzimidazole, it being possible for these heterocyclic radicals to be substituted on the aromatic carbon atoms by chloro, phenyl, methoxy, ethoxy, methyl or ethyl, and for the nitrogen atoms in the NH groups of these heterocycles to be substituted by methyl, ethyl or benzyl, or is a hydrogen atom;

X is an oxygen atom or a carbonyloxy group of the formula —CO—O— which are bound to W in the ortho position relative to the nitrogen atom, or X is a sulfo group;

$R^1$ is a hydrogen atom or a lower alkyl group, a lower alkoxy group, a chlorine or bromine atom, a lower alkanoylamino group such as an acetylamino group, or a sulfo group;

Pc is the radical of a metal-containing phthalocyanine such as, for example, of a copper, cobalt or nickel phthalocyanine, it being possible for the phthalocyanine radical additionally to be substituted in the 3- and/or 4-positions of the carbocyclic aromatic rings of the phthalocyanine such as, for example, by halogen atoms such as chlorine atoms or by aryl radicals such as phenyl radicals, and in which the sulfochloride, sulfonamide and/or sulfo groups are bound in the 3-and/or 4-positions of the carbocyclic aromatic rings of the phthalocyanine;

$R^\alpha$ is a hydrogen atom or a substituted or unsubstituted lower alkyl group such as, for example, an alkyl group substituted by hydroxy, cyano, carboxy, sulfo, sulfato, phosphato or phenyl and having 1 to 4 carbon atoms;

$R^\beta$ is a hydrogen atom or a lower alkyl group which can be substituted such as, for example, by hydroxy, carboxy, acetyloxy, sulfato, sulfo, phosphato, phenyl or sulfophenyl, or is cyclohexyl;

$R^\gamma$ is a hydrogen atom or a lower alkyl group which can be substituted such as, for example, by hydroxy, sulfo, carboxy sulfato, phosphato, acetyloxy, phenyl or sulfophenyl, or is a phenyl or naphthyl radical which can be substituted, for example by lower alkyl, lower alkoxy, chloro, carboxy or sulfo, or $R^\beta$ and $R^\gamma$ together with the nitrogen atom and an alkylene radical having 3 to 8 carbon atoms, preferably 4 to 6 carbon atoms, or with a further hetero atom such as a nitrogen atom or an oxygen atom and two lower alkylene radicals form the radical of a 4- to 8-membered heterocyclic ring such as, for example, a piperidino, piperazino or morpholino radical;

G is an aromatic carbocyclic or aromatic heterocyclic radical, preferably a substituted or unsubstituted phenylene or napthylene radical, in particular a phenylene or naphthylene radical which can be substituted by substituents from the group consisting of lower alkyl, lower alkoxy, halogen such as chloro and bromo, carboxy, nitro and sulfo;

T is a direct bond or a divalent organic linking unit such as, for example, an alkylene radical having 1 to 6 carbon atoms or an alkyleneamino group whose alkyl radical has 1 to 6 carbon atoms and whose amino group can be additionally substituted by a substituted or unsubstituted lower alkyl radical, for example the abovementioned radical, or is, for example, a radical of the formula

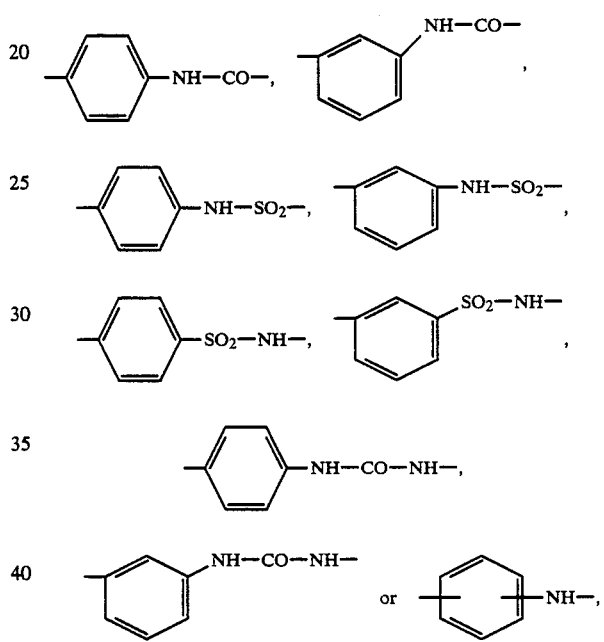

of these, preferably a radical of the formula

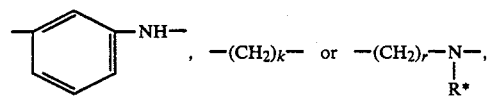

in which
k is a whole number from 1 to 5,
r is a whole number from 2 to 6 and
R* is a hydrogen atom or an alkyl group having 1 to 5 carbon atoms, or T together with a group —N($R^\alpha$)— forms a radical of the general formula

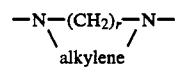

in which
r has the abovementioned meaning and alkylene represents a lower alkylene radical;

V is a direct bond or a group of the formula

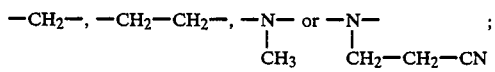

p is the number 1 or 2;
a is a whole number from 1 to 4;
b is a whole number from zero to 3;
c is a whole number from zero to 3, it being possible for a, b and c to be identical to or different from one another, although the sum of (a+b+c) is no more than 4.

In the statements above and below, lower alkyl denotes an alkyl group having 1 to 5 carbon atoms, in particular having 1 to 4 carbon atoms such as, preferably, a methyl or ethyl group. Lower alkoxy denotes an alkoxy group having 1 to 5 carbon atoms, in particular having 1 to 4 carbon atoms, preferably a methoxy or ethoxy group, and lower alkanoylamino denotes an alkanoylamino group whose alkyl radical has 1 to 4 carbon atoms, preferably a propionylamino and, in particular, an acetylamino group.

In the formulae (6a) and (6c), the grouping corresponding to the general formula (9a)

(9a)

preferably denotes a radical of the general formula (10a) or (10b)

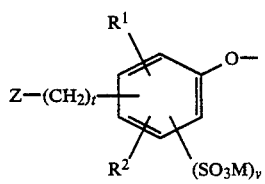
(10a)

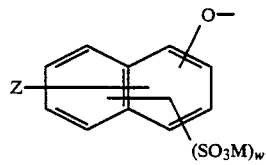
(10b)

in which
Z and M have the abovementioned meanings,
t denotes the number zero, 1, 2, 3 or 4,
v is the number zero or 1 (this group, in the case of v=zero, standing for a hydrogen atom) and
w denotes the number 1, 2, or 3 and
$R^2$ is a hydrogen atom, lower alkyl group, a lower alkoxy group, a chlorine or bromine atom.

In the formulae (6a) and (6b), the grouping according to the general formula (9b)

(9b)

preferably denotes a radical of the general formulae (11a) to (11e)

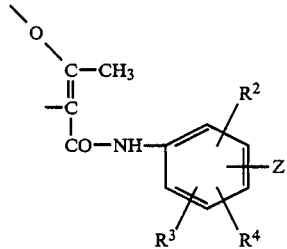
(11a)

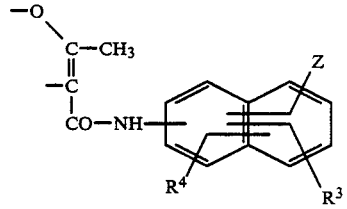
(11b)

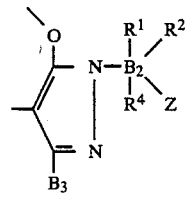
(11c)

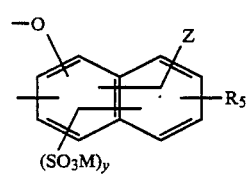
(11d)

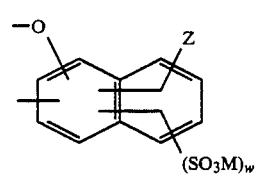
(11e)

in which
Z, M, $R^1$, $R^2$ and w have the abovementioned meanings,
$R^3$ is a hydrogen atom, a lower alkyl group, a lower alkoxy group, a chlorine or bromine atom or a sulfo group,
$R^4$ is a hydrogen atom, a lower alkyl group or a sulfo group,
$R^5$ is a lower alkanoylamino group or a benzoylamino group which can be substituted by a sulfo group or a β-chloroethylsulfonyl group,
$B_2$ denotes a benzene or naphthalene ring,
$B_3$ is a lower alkyl group, preferably a methyl group, a carboxyl group, a carbomethoxy group, a carbethoxy group or a phenyl radical and
y stands for the number zero or, preferably, for 1 or 2 (where in this case this group, if y is zero, denotes a hydrogen atom).

Of these dyestuffs, for example, those synthesized dyestuffs are of particular interest for the process according to the invention which correspond to the general formulae (12a), (12b), (12c) and (12d):

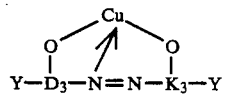 (12a)

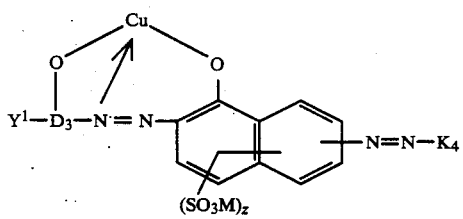 (12b)

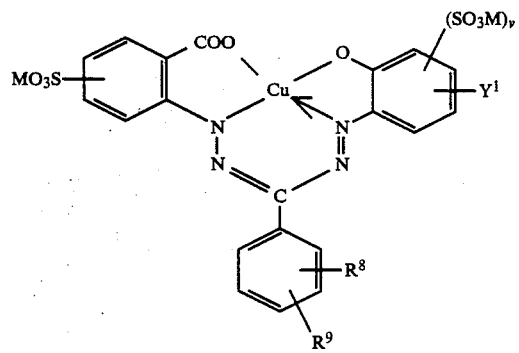 (12c)

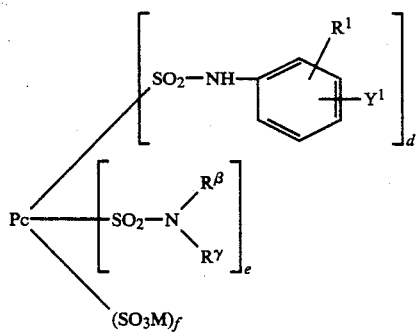 (12d)

in which the symbols have the following meanings:

Y is a hydrogen atom or a vinylsulfonyl group or a group of the abovementioned and defined general formula (7a), at least one of the two Ys denoting a vinylsulfonyl group or a group of the general formula (7a);

$Y^1$ is a vinylsulfonyl group or a group corresponding to the abovementioned and defined general formula (7a);

$D_3$ is a benzene or naphthalene ring which can be substituted by a nitro group or a lower alkoxy group such as a methoxy group, or by a chlorine atom and/or 1 or 2 sulfo groups;

$K_3$ is a naphthalene ring which is substituted by 1 or 2 sulfo groups and can be additionally substituted or an acetylamine or benzolamine group, the oxy group binding the copper atom in the form of a complex being bound to the naphthalene radical in the ortho-position relative to the azo group, or $K_3$ is a pyrazol-4,5-ylene radical on which the oxy group is present in the 5-position and the azo group in the 4-position and which is substituted in the 3-position by a carbomethoxy or carbethoxy group, or preferably by a carboxy group or methyl group, and which is substituted in the 1-position by a naphthyl or, preferably, a phenyl radical, it being possible for the naphthyl and phenyl radicals to be substituted by 1, 2 or 3 substituents from the group consisting of methoxy, ethoxy, chloro, bromo, methyl and sulfo, the optionally fiber-reactive group Y on $K_3$, if $K_3$ is a pyrazolone radical, being bound to this phenyl or naphthyl radical which is in the 1-position;

$K_4$ is a naphthol radical which can be substituted by 1 or 2 or 3 sulfo groups and optionally additionally by an acetylamino or benzoylamino group, or is a 3-methyl-or 3-carboxy-pyrazol-5-on-4-yl radical which is substituted in the 1-position by a phenyl or naphthyl radical, which can be substituted by 1, 2 or 3 substituents from the group consisting of methoxy, ethoxy, methyl, ethyl, carboxy, sulfo and chloro, preferably 1 or 2 sulfo groups;

M has the abovementioned meaning;

z is the number 1 or 2;

v is the number zero or 1 (where, if v is zero, this group denotes a hydrogen atom);

$R^8$ is a hydrogen atom or a chlorine atom or a sulfo group;

$R^9$ is a hydrogen atom or a sulfo group;

$R^1$ has the abovementioned meaning;

Pc is the radical of a nickel or copper phthalocyanine molecule;

$R^\beta$ is a hydrogen atom or a methyl or ethyl group which can be substituted by a hydroxy, carboxy or sulfo group;

$R^\gamma$ is a hydrogen atom or a methyl or ethyl group which can be substituted by a hydroxy, carboxy or sulfo group;

d is a whole or fractional number between 1 and 2.5;
e is a whole or fractional number between 0 and 1.5;
f is a whole or fractional number between 0.5 and 2;
the sum (d+e+f) is a whole or fractional number between 2.2 and 4.

To minimize the copper ion content of synthesized copper complex azo dyestuffs by means of the process according to the invention, the synthesized dyestuffs corresponding to the general formula (12e) are likewise of particular interest:

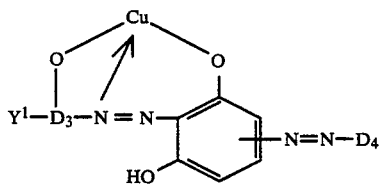

(12e)

in which $Y^1$ and $D_3$ have the abovementioned meanings and $D_4$ is a phenyl which can be substituted by 1, 2 or 3 substituents from the group consisting of methyl, ethyl, methoxy, ethoxy, chloro, bromo, carboxy, nitro and sulfo, and preferably contains at least one sulfo group, or is a naphthyl substituted by 1, 2 or 3 sulfo groups.

In the abovementioned general formulae, the individual formula constituents within their definitions can, in each case, have meanings identical to or different from one another.

Heavy metal complex dyestuffs of this type and their synthetic routes are known in a large number from the literature such as, for example, from German Patent No. 1,126,542, DE Offenlegungsschriften Nos. 2,461,481, 2,533,250, 2,634,497, 2,634,856, 2,634,909, 2,016,862, 2,634,787, 2,945,537, 2,655,625, 2,844,597, 2,922,722, 2,945,493, 2,839,562, 2,847,912, 3,124,172, 3,230,102, 3,239,364, 3,337,591 and 3,406,232, European Applic. Public. Nos. 0,005,207A, 0,028,787A, 0,070,808A and 0,079,563A, U.S. Pat. Nos. 2,817,656, 4,138,395 and 4,544,739, Belgian Patents Nos. 828,811, 856,009, 856,579, 871,734, 872,812 and 873,319, British Applic. Public. Nos. 2,024,236A and 2,031,931A and Swiss Patents Nos. 634,094 and 639,991.

The Examples which follow serve to illustrate the invention. Parts and percentages are by weight, unless noted otherwise. Parts by volume relate to parts by weight as liters to kilograms. The dyestuff solutions described in the Examples also contain, in addition to the dyestuff, further organic and inorganic components originating in the synthesis. The heavy metal concentrations (in ppm) given were determined by conventional methods using photometry, potentiometry or atomic absorption spectroscopy.

EXAMPLE 1

The separations are started with 6,000 parts of a dyestuff solution containing 858 parts of the copper complex formazan dyestuff described in Example 2 of DE Offenlegungsschrift No. 2,945,537, having a pH of 3.8 and an ionogenic copper content of 824 ppm.

(a) Precipitation with sodium sulfide:

The solution is heated to 70° C., adjusted to a pH of 4.0 to 4.2 with a small amount of sodium carbonate and then treated with 8.05 parts of sodium sulfide (calculated as 100% strength; for example, used as 13.4 parts of hydrated 60% strength sodium sulfide), which corresponds to an excess of 2.5 mol %, relative to the amount of dyestuff present. The mixture is maintained at a pH between 4.8 and 5.2 by means of an acetic acid/acetate buffer. Within this pH range, stirring is continued at 70° C. for another 30 minutes, 12.5 parts of kieselguhr is then added, the mixture is cooled to 25°-30° C. and filtered. The filtrate is spray-dried. The dyestuff powder obtained has an ionogenic copper content of less than 5 ppm; the dyestuff yield is more than 98%, relative to the amount of dyestuff of the starting solution.

(b) Precipitation with sodium stearate:

The solution is heated to 70° C., adjusted to a pH of 4.0 to 4.2 with a small amount of sodium carbonate and then treated with 108.8 parts of sodium stearate, which corresponds to an excess of 20 mol %, relative to the amount of dyestuff used. The mixture is maintained at a pH between 4.8 and 5.2 by means of an acetic acid/acetate buffer. Within this pH range, stirring is continued at 70° C. for another 90 minutes, 12.5 parts of kieselguhr is then added, the mixture is cooled to 25°-30° C. and filtered. The filtrate is spray-dried. The dyestuff powder obtained has an ionogenic copper content of less than 39 ppm; the dyestuff yield is more than 98%, relative to the amount of dyestuff of the starting solution.

(c) Ionogenic copper minimization using a cation-exchanger:

An exchanger column, packed with 1,000 parts of a weakly acid cation-exchanger containing carboxyl groups as exchanging groups and with an exchanging capacity of 10 meq/g is conditioned using an aqueous 2N hydrochloric acid solution. The resin is then washed with water until the eluate gives a neutral reaction. The copper-salt-containing dyestuff solution is then transferred to the exchanger column, and the dyestuff is completely eluted with water. The eluate is spray-dried. The dyestuff powder obtained has an ionogenic copper content of less than 5 ppm; the dyestuff yield is more than 98%, relative to the amount of dyestuff of the starting solution.

(d) Precipitation with trimercapto-s-triazine:

The solution is heated to 70° C., adjusted to a pH of 4.8 to 5.2 with a small amount of sodium carbonate and then treated with 22.3 parts of trimercapto-s-triazine, which corresponds to an excess of 7.4 mol %, relative to the amount of dyestuff used. The mixture is maintained at a pH between 4.8 and 5.2 by means of an acetic acid/acetate buffer. Within this pH range, stirring is continued at 70° C. for another 60 minutes, 12.5 parts of kieselguhr is then added, the mixture is cooled to 25°-30° C. and filtered. The filtrate is spray-dried.

The dyestuff powder obtained has an ionogenic copper content of less than 5 ppm; the dyestuff yield is more than 98%, relative to the amount of dyestuff of the starting solution.

(e) Precipitation with 2-aminobenzoic acid:

The solution is heated to 70° C., adjusted to a pH of 5.2 to 5.5 with a small amount of sodium carbonate and then treated with 51.4 parts of 2-aminobenzoic acid, which corresponds to an excess of 22 mol %, relative to the amount of dyestuff used. The mixture is maintained at a pH between 4.8 and 5.2 by means of an acetic acid/ acetate buffer. Within this pH range, stirring is continued at 70° C. for another 60 minutes, 12.5 parts of kieselguhr is then added, the mixture is cooled to 25°–30° C. and filtered. The filtrate is spray-dried.

The dyestuff powder obtained has an ionogenic copper content of 24 ppm; the dyestuff yield is more than 98%, relative to the amount of dyestuff of the starting solution.

(f) Precipitation with 8-hydroxyquinoline:

The solution is heated to 70° C., adjusted to a pH of 4.8 to 5.2 with a small amount of sodium carbonate and then treated with 47.7 parts of 8-hydroxyquinoline, which corresponds to an excess of 17.3 mol %, relative to the amount of dyestuff used. The mixture is maintained at a pH between 4.8 and 5.2 by means of an acetic acid/acetate buffer. Within this pH range, stirring is continued at 70° C. for another 60 minutes, 12.5 parts of kieselguhr is then added, the mixture is cooled to 25°–30° C. and filtered. The filtrate is spray-dried. The dyestuff powder obtained has an ionogenic copper content of less than 5 ppm; the dyestuff yield is more than 98%, relative to the amount of dyestuff of the starting solution.

EXAMPLES 2 to 5

The precipitation reactions according to the invention described in Examples 2 to 5 which follow are carried out essentially analogously to the embodiments of Example 1, so that a verbal repetition is unnecessary and the corresponding data can be listed in the form of a table. In Sub-Examples (a) to (f), the following precipitants or cation-exchangers were used:

in Ex. a: sodium sulfide (calculated as 100% strength)
in Ex. b: sodium stearate
in Ex. c: cation-exchanger containing carboxyl exchanging groups and having an exchanging capacity of about 10 meq/g
in Ex. d: trimercapto-s-triazine
in Ex. e: 2-aminobenzoic acid
in Ex. f: 8-hydroxyquinoline.

Under the heading "parts of precipitant", the number in brackets shows the excess amount used, relative to the amount of dyestuff; the amount equivalent to that of the metal ion is therefore calculated from the difference of the two numbers given. The dyestuff yield of the virtually metal-ion-free final dyestuff, relative to the amount of dyestuff of each starting solution, is in all cases more than 98%.

EXAMPLE 2

The separations are started with 6,000 parts of a dyestuff solution containing 797 parts of the copper complex monoazo dyestuff described in Example 33 of DE Offenlegungsschrift No. 2,016,862 and having a pH of 4.7 and an ionogenic copper content of 431 ppm.

EXAMPLE 3

The separations are started with 10,000 parts of an aqueous dyestuff solution containing 1,047 parts of the copper complex disazo dyestuff(having the Colour Index No. C.I. 23155) described in U.S. Pat. No. 2,817,656 and having pH of 4.5 and an ionogenic copper content of 522 ppm.

EXAMPLE 4

The separations are started with 10,000 parts of an aqueous dyestuff solution containing 1,374 parts of the nickelphthalocyanine dyestuff described in Example 4 of DE Offenlegungsschrift No. 2,824,211 and having a pH of 4.3 and an ionogenic nickel content of 238 ppm.

EXAMPLE 5

Separations are started with 6,000 parts of an aqueous dyestuff solution containing 654 parts of the 1:2 cobalt complex azo dyestuff mentioned in Colour Index under No. C.I. 11640 and having a pH of 6.8 and an ionogenic cobalt content of 315 ppm.

| Ex. | Part of precipitant | Precipitation conditions T (°C.) | pH | Buffer | Time | Ionogenic metal content in the final dyestuff |
|---|---|---|---|---|---|---|
| 2a | 7.5 (4.3) | 25–30 | 4.8–5.2 | acetate | 30 min | 6 ppm |
| 2b | 86.1 (61.2) | 70–75 | 4.8–5.2 | acetate | 90 min | 41 ppm |
| 2c | 1000 | 25–30 | — | — | — | <5 ppm |
| 2d | 9.2 (4.4) | 40–45 | 6.2–6.5 | acetate | 30 min | 10 ppm |
| 2e | 34.4 (23.3) | 70–75 | 4.8–5.2 | acetate | 60 min | 18 ppm |
| 2f | 33.6 (21.8) | 70–75 | 4.8–5.2 | acetate | 60 min | 15 ppm |
| 3a | 10.3 (3.9) | 25–30 | 6.0–6.5 | bicarbonate | 30 min | <5 ppm |
| 3b | 126.8 (76.5) | 70–75 | 4.8–5.2 | acetate | 90 min | 41 ppm |
| 3c | 1000 | 25–30 | — | — | — | <5 ppm |
| 3d | 14.1 (4.4) | 25–30 | 7.5–8.0 | bicarbonate | 45 min | <5 ppm |
| 3e | 43.1 (20.6) | 70–75 | 6.0–6.5 | bicarbonate | 60 min | 25 ppm |
| 3f | 49.9 (24.7) | 70–75 | 6.5–6.7 | bicarbonate | 60 min | 22 ppm |
| 4a | 5.2 (2.0) | 25–30 | 4.8–5.2 | acetate | 30 min | <5 ppm |
| 4b | 86.0 (61.2) | 70–75 | 4.8–5.2 | acetate | 90 min | 36 ppm |
| 4c | 1000 | 25–30 | — | — | — | <5 ppm |
| 4d | 13.6 (8.8) | 40–45 | 5.2–5.5 | acetate | 45 min | 10 ppm |
| 4e | 31.6 (20.5) | 70–75 | 4.8–5.2 | acetate | 60 min | 12 ppm |
| 4f | 33.6 (21.8) | 70–75 | 4.8–5.2 | acetate | 60 min | 18 ppm |
| 5a | 4.5 (2.0) | 60–65 | 7.0–7.5 | bicarbonate | 30 min | <5 ppm |
| 5b | 80.8 (61.2) | 70–75 | 4.8–5.2 | acetate | 90 min | 52 ppm |
| 5c | 1000 | 25–30 | — | — | — | <5 ppm |
| 5d | 12.7 (8.9) | 40–45 | 7.5–8.0 | bicarbonate | 45 min | <5 ppm |
| 5e | 36.2 (27.4) | 70–75 | 7.0–7.5 | bicarbonate | 60 min | 25 ppm |
| 5f | 38.3 (29.0) | 70–75 | 7.0–7.5 | bicarbonate | 60 min | 18 ppm |

EXAMPLES 6a to 6q

In each case, the separations are started with 6,000 parts of a dyestuff solution containing 858 parts of the copper complex formazan dyestuff described in Example 2 of DE Offenlegungsschrift No, 2,945,357 and having a pH of 3.8 and an ionogenic copper content of 824 ppm.

This solution is heated to 70° C. and adjusted to a pH of 4.0 to 4.2 with a small amount of sodium carbonate, then treated with the precipitating agent listed in the respective Table Example, maintained at a pH between 5.0 and 5.5 by means of an acetic acid/acetate buffer, stirred in this pH range at 70° to 75° C. for another 60 min, then treated with 12.5 parts of kieselguhr, cooled to from 25° to 30° C. and filtered. The filtrate is spray-dried.

The dyestuff powder obtained has the ionogenic copper content listed in the respective table example; the dyestuff yield in each case is more than 98%, relative to the amount of dyestuff of the starting solution.

| Ex. | Precipitating reagent | Amount used thereof | Final copper$^{2(+)}$ content |
|---|---|---|---|
| 6a | Stearic acid | 105.4 parts | 28 ppm |
| 6b | Palmitic acid | 91.0 parts | 34 ppm |
| 6c | Myristic acid | 85.7 parts | 41 ppm |
| 6d | Lauric acid | 81.1 parts | 43 ppm |
| 6e | Capric acid | 69.8 parts | 25 ppm |
| 6f | Octanoic acid | 65.6 parts | 36 ppm |
| 6g | Isodecanoic acid | 67.0 parts | 54 ppm |
| 6h | Isononanoic acid | 71.0 parts | 71 ppm |
| 6j | 2-Ethylhexanoic acid | 69.0 parts | 89 ppm |
| 6k | Oleic acid | 102.0 parts | 112 ppm |
| 6m | Sodium oleate | 110.0 parts | 123 ppm |
| 6n | Malonic acid | 39.0 parts | 132 ppm |
| 6p | 1:1 mixture of the monolauryl and dilauryl esters of ortho-phosphoric acid | 118.0 parts | 45 ppm |
| 6q | 1:1 mixture of the mono-stearyl and distearyl esters of orthophosphoric acid | 111.3 parts | 51 ppm |

We claim:

1. A process for the reduction of heavy metal ions in the synthesis of a water-soluble heavy metal complex dyestuff having a fiber-reactive group, which comprises carrying out the removal of the excess heavy metal ions by precipitating them as an essentially water-insoluble heavy metal salt from the aqueous synthesis solution by means of a compound, or a combination of these compounds, selected from sodium sulfide, 2-amino-benzoic acid or its water-soluble salt and trimercapto-s-triazine or its water-soluble salt at a pH in the range of from 4 to 7 and at a temperature between 10° and 100° C., or carrying out the removal by means of an ion-exchanger containing sulfo or carboxy groups or both as exchanging groups at a pH in the range of from 4 to 7 and at a temperature from 10° to 30° C.

2. The process as claimed in claim 1, wherein a compound or more of these compounds selected from sodium sulfide, 2-amino-benzoic acid or its water-soluble salt, and trimercapto-s-triazine and its water-soluble salt is added to the dyestuff solution and the precipitated heavy metal salt(s) of this (these) compound(s) is separated off from the dyestuff solution.

3. The process as claimed in claim 1, wherein the precipitating agent is sodium sulfide.

4. The process as claimed in claim 1, wherein the precipitating agent is 2-aminobenzoic acid.

5. The process as claimed in claim 1, wherein the precipitating agent is trimercapto-s-triazine.

6. The process as claimed in claim 1, wherein the ion-exchanger contains sulfo and carboxyl groups as exchanging groups.

7. The process as claimed in claim 6, wherein the ion-exchanger contains carboxyl groups as exchanging groups.

* * * * *